(12) United States Patent
Garrels (10) Patent No.: US 9,609,968 B2
(45) Date of Patent: Apr. 4, 2017

(54) BASTING COOKING UTENSIL AND METHOD

(71) Applicant: Lawrence B. Garrels, Tacoma, WA (US)

(72) Inventor: Lawrence B. Garrels, Tacoma, WA (US)

( * ) Notice: Subject to any disclaimer, the term of this patent is extended or adjusted under 35 U.S.C. 154(b) by 34 days.

(21) Appl. No.: 14/639,342

(22) Filed: Mar. 5, 2015

(65) Prior Publication Data

US 2015/0320261 A1 Nov. 12, 2015

Related U.S. Application Data

(60) Provisional application No. 61/948,317, filed on Mar. 5, 2014.

(51) Int. Cl.
  *A47J 37/10* (2006.01)
  *A47G 21/04* (2006.01)
  *A23L 15/00* (2016.01)

(52) U.S. Cl.
  CPC ............ *A47G 21/04* (2013.01); *A23L 15/00* (2016.08); *A47J 37/106* (2013.01); *A23V 2002/00* (2013.01)

(58) Field of Classification Search
  CPC ..... A23L 15/00; A23V 2002/00; A47G 21/04; A47J 37/106
  USPC .......................................................... 30/327
  See application file for complete search history.

(56) References Cited

U.S. PATENT DOCUMENTS

| | | | | |
|---|---|---|---|---|
| 674,741 A | * | 5/1901 | Patterson | B21D 53/62 30/327 |
| 784,830 A | * | 3/1905 | Beistle | A47G 21/04 215/391 |
| 1,128,190 A | * | 2/1915 | Routery | A47G 21/04 30/327 |
| 1,406,135 A | * | 2/1922 | Abrell | A47G 21/04 30/327 |
| 1,506,752 A | * | 9/1924 | Hill | A01J 11/12 210/514 |
| 2,724,894 A | * | 11/1955 | La Tour | A47G 21/04 30/324 |
| 9,351,595 B2 | * | 5/2016 | Dietrich | A47G 19/06 |

(Continued)

FOREIGN PATENT DOCUMENTS

DE    100 43 044 A1  * 12/2001
GB        229799    *  3/1925
GB        438474    * 11/1935

*Primary Examiner* — Hwei C Payer
(74) *Attorney, Agent, or Firm* — Dean A. Craine (57) ABSTRACT

A basting cooking utensil that temporarily attaches over the top edge of a pan used to cook an egg. The utensil includes a compound curved handle with a basin attached or formed at its distal end configured to hold a small quantity of a hot oil or butter. Mounted or formed at the handle's mid-section is pan edge resting structure that engages the pan's top edge and temporarily holds the handle upright against the pan's side wall. The basin is rotated along its longitudinally axis so the first lateral edge is tilted downward and rests against the bottom surface of the pan when the handle is aligned vertically and tilted slightly laterally over the side of the pan. When the handle is held vertically, the opposite second lateral edge is elevated and tilted upward and easily scoop hot oil or butter from the pan.

7 Claims, 10 Drawing Sheets

(56) References Cited

U.S. PATENT DOCUMENTS

| | | | |
|---|---|---|---|
| 2010/0304005 A1* | 12/2010 | Beale | A47J 43/287 |
| | | | 426/665 |
| 2012/0207891 A1* | 8/2012 | Pantaleo | A47J 29/02 |
| | | | 426/300 |
| 2013/0047445 A1* | 2/2013 | Zheng | A47G 21/04 |
| | | | 30/324 |
| 2014/0250698 A1* | 9/2014 | Lord | A47G 21/02 |
| | | | 30/327 |
| 2015/0320261 A1* | 11/2015 | Garrels | A23L 15/00 |
| | | | 426/304 |

* cited by examiner

BASTING COOKING UTENSIL AND METHOD

This utility patent application is based upon and claims the filing date benefit of U.S. provisional patent application (Application No. 61/948,317) filed on Mar. 5, 2014.

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention pertains to cooking utensils, and more particularly to cooking utensils used to scoop and collect a small volume of hot liquid from a container in which a food is being cooked and then gradually poured over the food to evenly cook the food.

2. Description of the Related Art

Many individuals enjoy cooking eggs 'sunny side up' in which the egg shells are cracked and the yoke and egg white are carefully deposited over a hot pan so the egg white is evenly distributed around the yoke. Ideally, the eggs after being depositing on the pan should not be disturbed during the cooking stage because heat from the pan slowly cooks the egg from the bottom up first causing the albumin in the egg white to harden and turn white. Eventually, the yoke also hardens but should remain partially runny.

Because the top of the egg white and the yoke never directly contact the pan, the top surface of the egg white and the yoke may be excessively runny if the egg is undercooked. To prevent undercooking, some chefs pace a cover or lid over the pan to apply heat to the top surface of the egg. Because the eggs are hidden, they can be easily over cooked.

What is needed is a cooking utensil designed for cooking delicate foods, such a 'sunny side up eggs', that cannot be disturbed while cooking in a pan but require the application of heat to the top surface of the food to cook the food to a desired state.

SUMMARY OF THE INVENTION

Disclosed here in a cooking utensil designed for cooking delicate foods, such 'a sunny side up eggs', that cannot be disturbed while being cooked in a pan but require applying heat to the top surface of the food to evenly cook the food. The cooking utensil is a basting cooking utensil that includes a handle with a basin attached or formed at its distal end configured to hold a small quantity of a hot basting liquid. The basin is aligned on the distal end of the handle and rotated along its longitudinally axis so one lateral edge (hereinafter called a first lateral edge) is tilted downward and rests against the bottom surface of the pan when the handle is held or rests vertically upward and against the side wall of the pan. The basin's opposite lateral edge, (hereinafter called a second lateral edge) is elevated and tilted upward. During use, the user grips the upper section of the handle extending above the top edge of the pan and moves the handle laterally to sweep or drag the basin so the first lateral edge scoops hot basting fluid from the bottom of the pan. Once the desired hot basting liquid has been collected in the basin, the basin in is then positioned over the egg and tilted to deposit the hot basting fluid over the yoke and the top surface of the egg white. This process is repeated several times until the egg is sufficiently cooked.

Mounted or formed at the handle's mid section is a pan edge resting structure configured to extend over top edge of the pan and temporarily hold the handle upright and position the upper section of the handle above the top edge of the pan. When cooking a 'sunny side egg', the utensil may be used continuously or intermittently. When not used, the basin should be left inside the pan to prevent dripping of the hot basting fluid onto the stove top or counter. The pan edge resting structure engages the top edge of the pan so the basin may rest inside the pan and the handle extends above the top edge.

Attached or formed on the handle's proximal end is an optional heat insulating cover.

DESCRIPTION OF THE PREFERRED EMBODIMENT(S)

Figure 1:
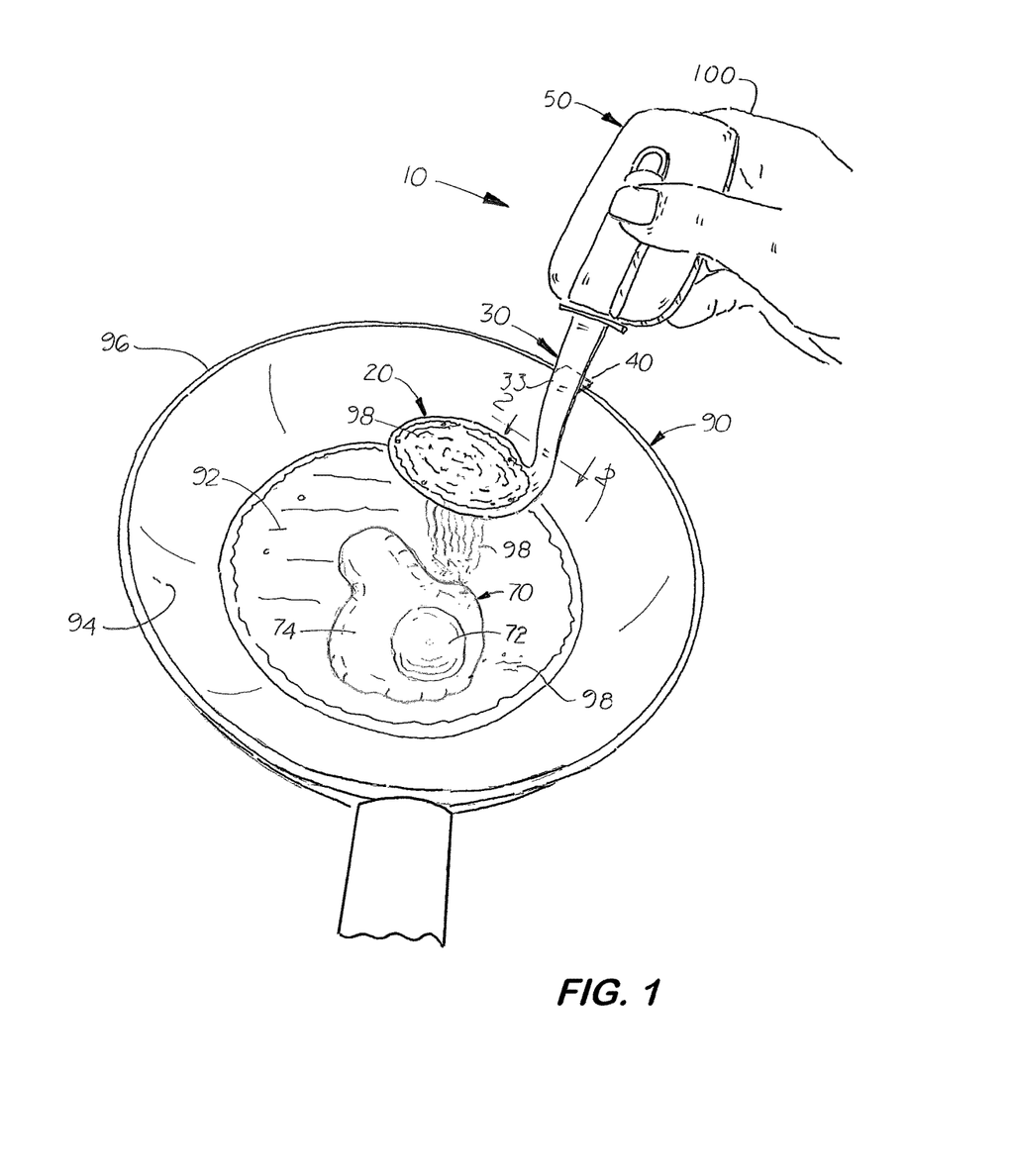
FIG. 1 is a perspective view of a fry pan cooking a 'sunny side up' egg and showing a chef hold the basting cooking utensil in one hand and pouring hot basting fluid over the egg.

FIG. 1 is a perspective view of a fry pan 90 cooking a 'sunny side up' egg 70 with a center yoke 72, surrounded by egg white 74 on the pan's bottom surface 92 and partially covered with a hot cooking liquid 98 (cooking oil or butter) and showing a chef 100 hold the basting cooking utensil 10 and pouring hot cooking liquid 98 collected from the pan over the egg 70.

Figure 2:
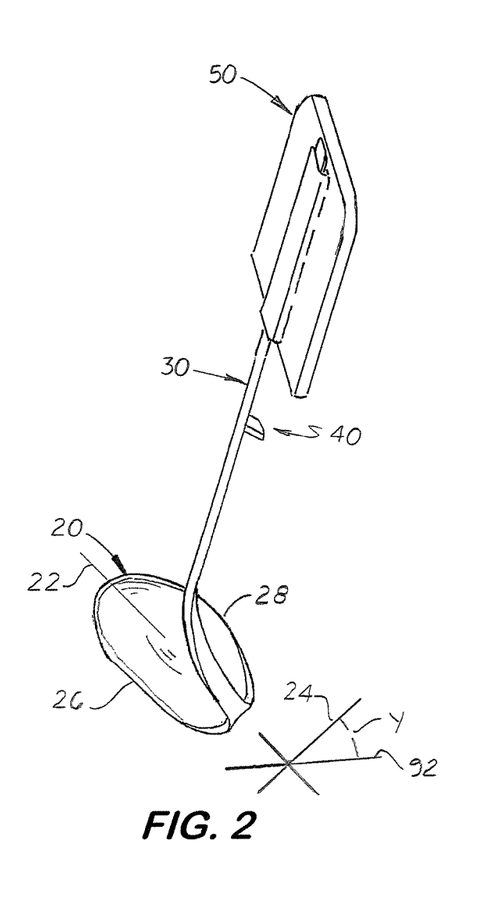
FIG. 2 is a top perspective view of the basting cooking utensil showing the basin on a flat surface and showing the orientation of the handle used in the first embodiment.
Figure 3:
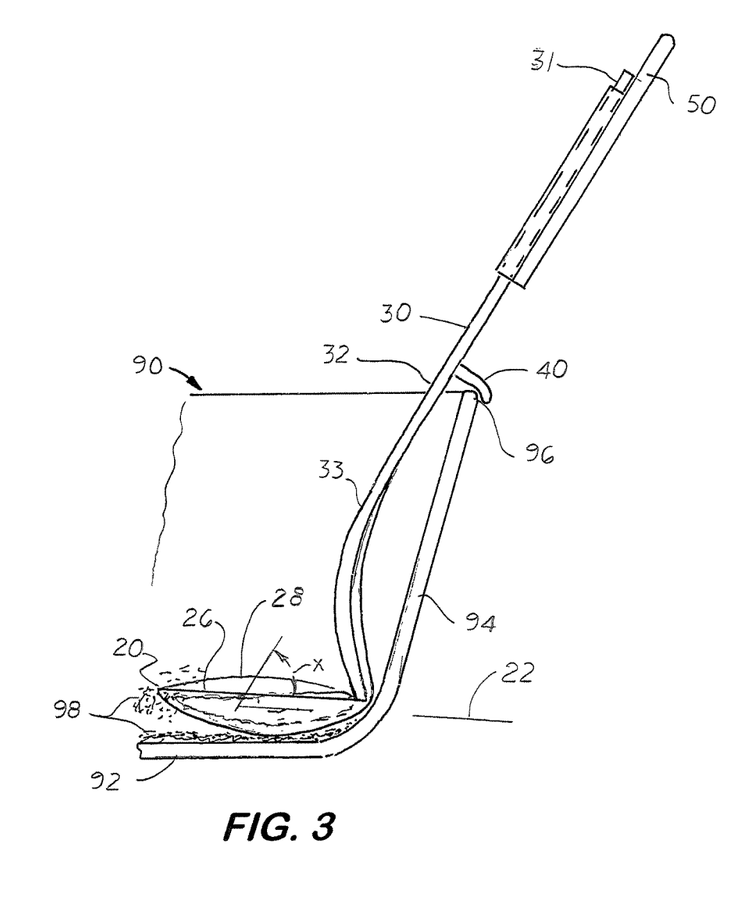
FIG. 3 is a side elevational view of the basting cooking utensil shown in FIG. 2.

As shown in FIGS. 2 and 3, the basting cooking utensil 10 includes a lower basin 20 attached or integrally formed with a compound curved handle 30. The basin 20 has a configuration similar to a large spoon or ladle that holds 15 to 30 mls of the hot cooking liquid 98.

The handle 30 includes an upper section 31 and a lower section 33. The lower section 33 is attached or is integrally formed with the rear end of the basin 20. The basin 20 includes with a longitudinal axis 22 aligned 18 to 60 degrees (shown as angle 'x' in FIG. 3) to the longitudinal axis 36 on the handle 30. In most applications, the longitudinal axis 22 is aligned approximately 35 degrees to the longitudinal axis of the handle 30. The basin 20 is also rotated 15 to 40 degrees (shown as angle 'y' in FIG. 2) along its longitudinal axis 22 thereby positioning the first lateral edge 26 of the basin 20 against the bottom surface 92 of a pan 90 elevating the second lateral edge 28 above the bottom surface of the pan 90 when the handle 30 extends vertically upward and rest against the side wall 94 of the pan 90.

Mounted or formed at the handle's mid section 32 is pan edge resting structure 40 configured to extend over top edge 96 of the pan 90 and temporarily hold the basting cooking utensil 10 inside the pan 90 in an upright position so the basin 20 may rest against the pan's hot bottom surface 92. Attached or formed on the handle's upper section 31 is an optional heat insulating cover 50.

Figure 4:
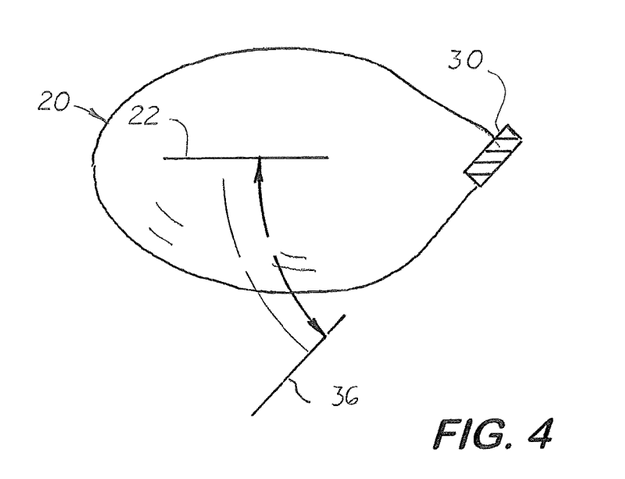
FIG. 4 sectional top plan view taken along line 2-2 in FIG. 1 showing the angle of the of the basin's longitudinal axis and the transverse axis of the lower section of the handle.

FIG. 4 sectional top plan view taken along line 2-2 in FIG. 1 showing the angle of the of the basin's longitudinal axis 22 and the transverse axis 36 of the lower section 33 of the handle 30

Figure 5:
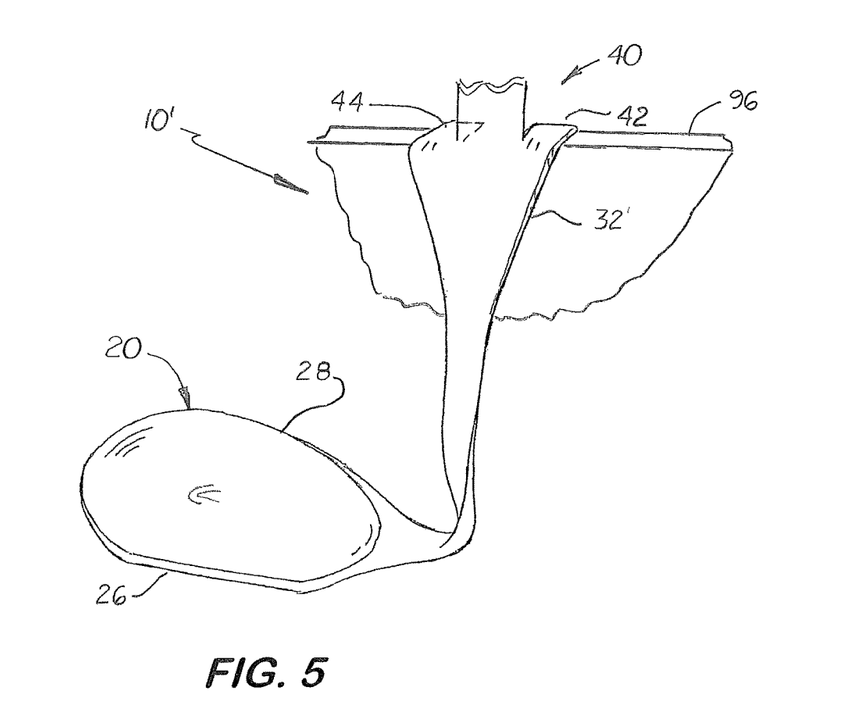
FIG. 5 is a perspective view of another embodiment of the basting cooking utensil with two hooks formed on the handle that rest over the top edge of the fry pan.

FIG. 5 is a perspective view of another embodiment of the basting cooking utensil 10' with two hooks 42, 44 formed on the mid section 32' of the handle that rest over the top edge 96 of the pan 90.

One of the unique design elements of the basting cooking utensil 10 is that it positions the handle 30 in an ergonomic position for a natural 'sweeping' wrist movement. The angles of the basin 20 and the lower section 33 of the handle 30 enabling the cook's wrist to simultaneously scope and deposit basting fluid 98 in a straight line onto the cooking egg. If the chef positions the utensil 10 directly opposite and in a straight line with the handle 30 and that starting (oil collect) position is against the opposite wall of the pan 90, the deposition of the basting fluid 98 should be in the direction of the handle 30. This affords a measure of control of application. Modifications of the tip of the pan angle and the positioning of the handle 30 relative to the cook's body, affords ease of oil application and still allows for natural wrist movement and comfort during use.

A key aspect of the invention is that it may be manufactured as a right hand version or a left hand version.

Figure 6:
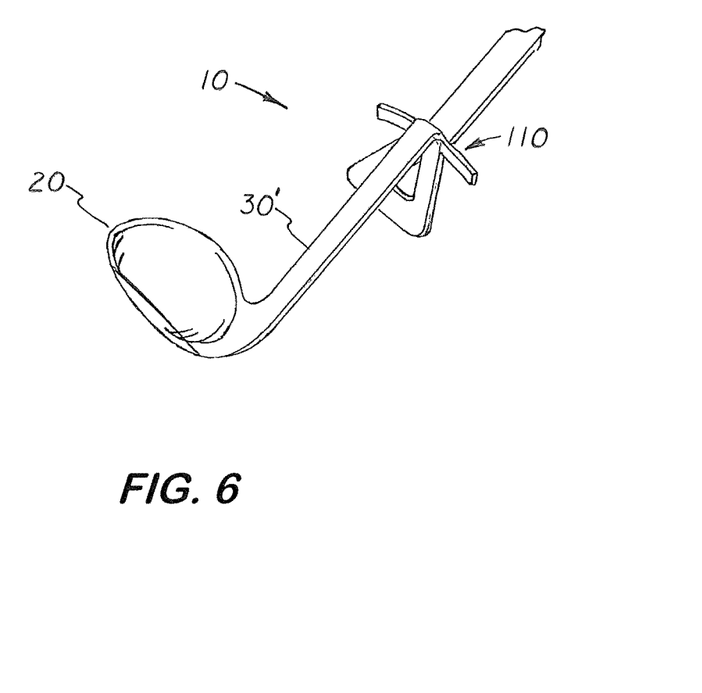
FIG. 6 is a perspective view of a straight handle embodiment of the basting cooking utensil with a t-shaped hook formed in the handle that captures the top edge of the pan.

In the first embodiment of the utensil 10, the handle 30 is curved and twisted as described above. FIG. 6 is a perspective view of a straight handle embodiment of the basting cooking utensil 10 with a t-shaped hook 110 is formed in the straight handle 30' that captures the top edge of the pan 90. The basin 20 is rotated 15 to 30 degrees along its transverse axis 36 with its longitudinal axis 22 aligned 30 to 50 degrees (shown as angle 'x' in FIG. 3) to the longitudinal axis 36 on the lower section of the handle 30 as described above. The first lateral edge 26 of the basin 20 is placed against the bottom surface of a pan 90 while the handle 30' extends vertically upward and rest against the side wall of the pan 90.

Figure 7:
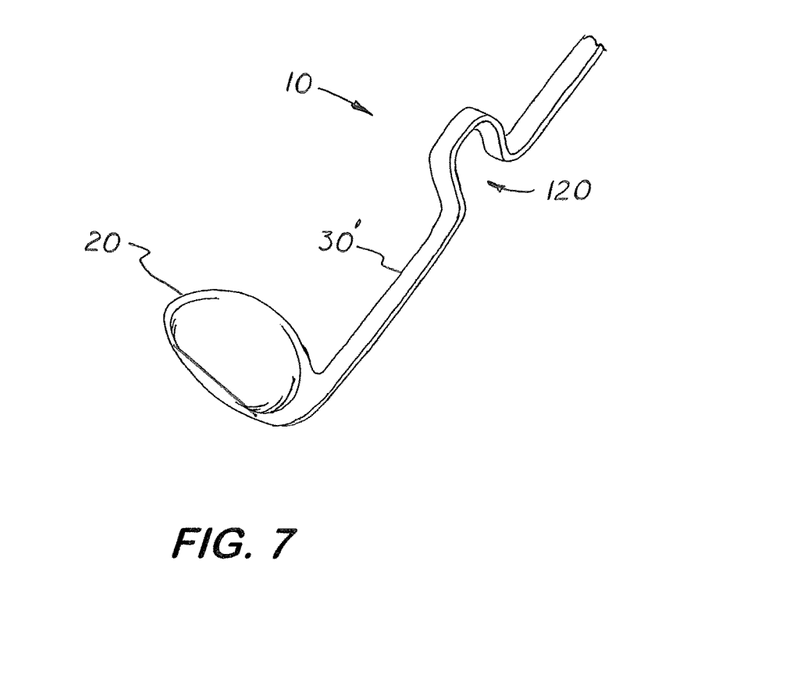
FIG. 7 is a perspective view of another straight handle embodiment of the basting cooking utensil with a wide upward extending curved formed in the middle section of the handle that captures the top edge of the pan.

FIG. 7 is a perspective view of another straight handle embodiment of the basting cooking utensil 10 with a wide upward extending curve 120 formed in the middle section of the handle 30' that captures the side wall and top edge of the pan.

Figure 8:
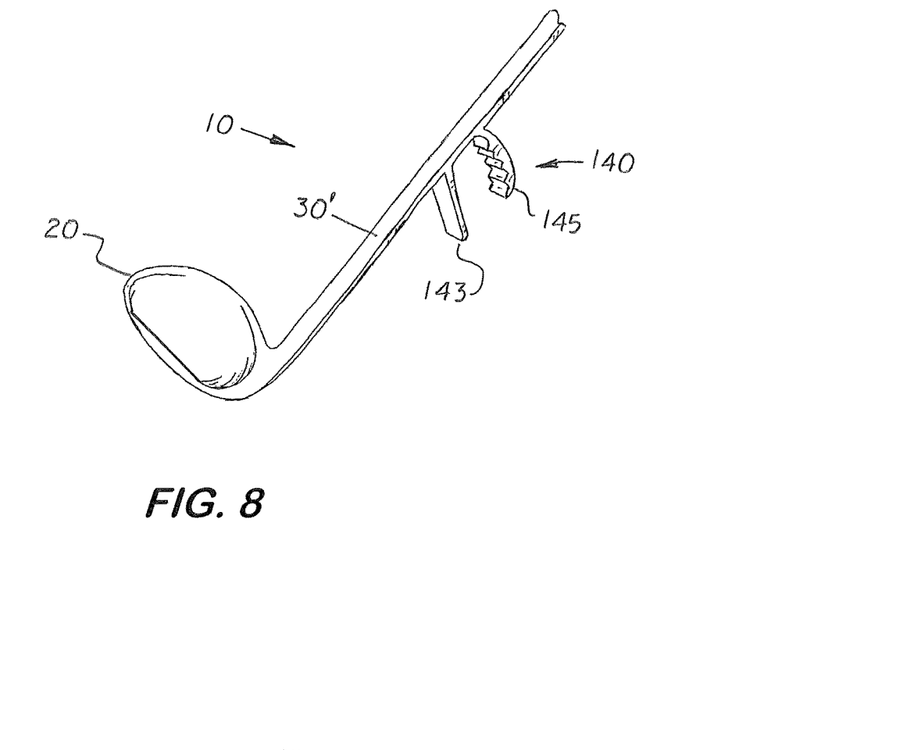
FIG. 8 is a perspective view of another straight handle embodiment of the basting cooking utensil with a flat and serrated jaws extending curved formed in the middle section of the handle that captures the top edge of the pan.

FIG. 8 is a perspective view of another straight handle embodiment of the basting cooking utensil 10 with flat and serrated jaws 143, 145 extending curved 140 formed in the middle section of the handle 30' that captures the side wall and top edge of the pan.

Figure 9:
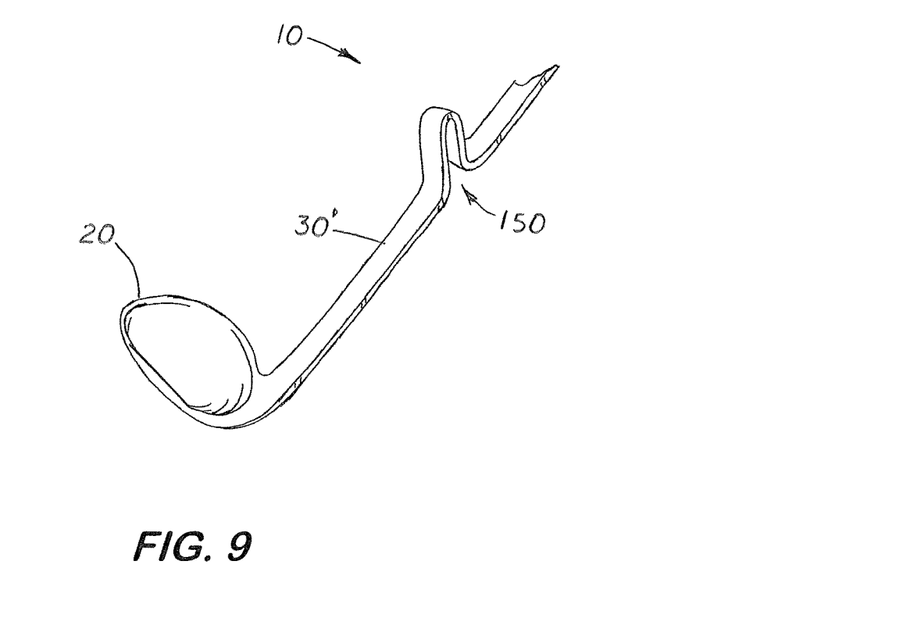
FIG. 9 is a perspective view of another straight handle embodiment of the basting cooking utensil similar to the utensil shown in FIG. 7 with a narrow upward extending curved formed in the middle section of the handle that captures the top edge of the pan.

FIG. 9 is a perspective view of another straight handle embodiment of the basting cooking utensil 10 similar to the utensil shown in FIG. 7 with a narrow upward extending curve 150 formed in the middle section of the handle 30' that captures the side wall and the top edge of the pan.

Figure 10:
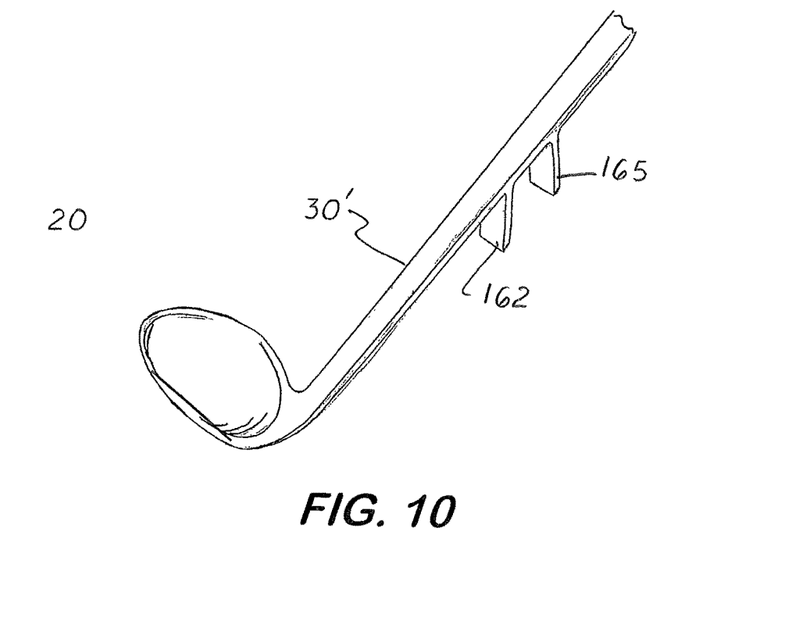
FIG. 10 is a perspective view of another straight handle embodiment of the basting cooking utensil similar to the utensil shown in FIG. 8 with two flat jaws formed on the middle section of the handle that captures the top edge of the pan.

FIG. 10 is a perspective view of another straight handle embodiment of the basting cooking utensil 10 similar to the utensil 10 shown in FIG. 8 with two flat arms 162, 165 formed on the middle section of the handle 30' that captures the top edge of the pan.

Figure 11:
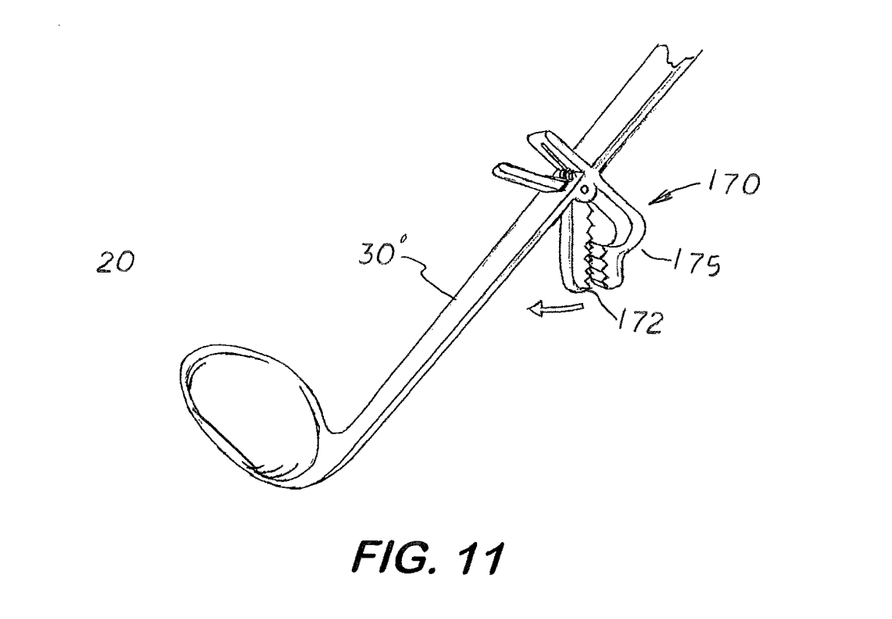
FIG. 11 is a perspective view of another straight handle embodiment of the basting cooking utensil with a spring biased, adjustable clamp formed on the middle section of the handle that captures the top edge of the pan.

FIG. 11 is a perspective view of another straight handle embodiment of the basting cooking utensil 10 with a spring-biased, adjustable clamp 170 comprising two jaws 172, 175 formed on the middle section of the handle 10 that captures the side wall of the pan.

Figure 12:
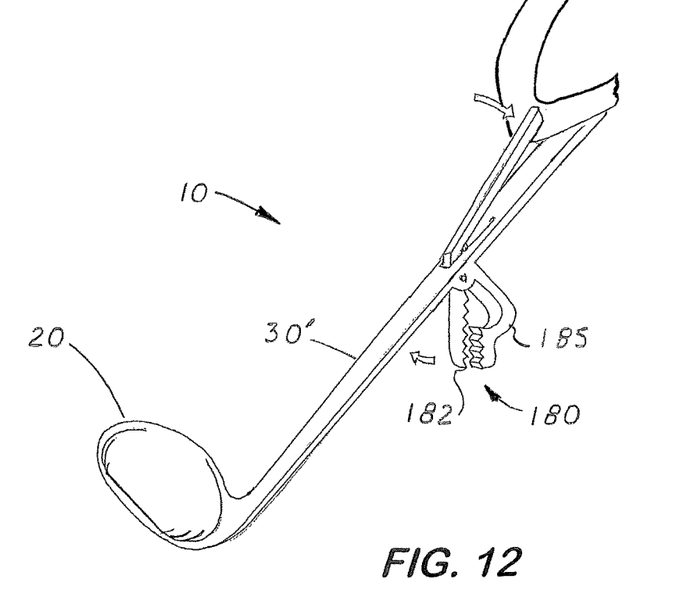
FIG. 12 is a perspective view of another straight handle embodiment of the basting cooking utensil with manually operated adjustable clamp formed on the middle section of the handle that captures the top edge of the pan.

FIG. 12 is a perspective view of another straight handle embodiment of the basting cooking utensil 10 with manually operated adjustable clamp 180 with two jaws 182, 185 formed on the middle section of the handle 30' that captures the side wall of the pan.

Figures 13, 14:
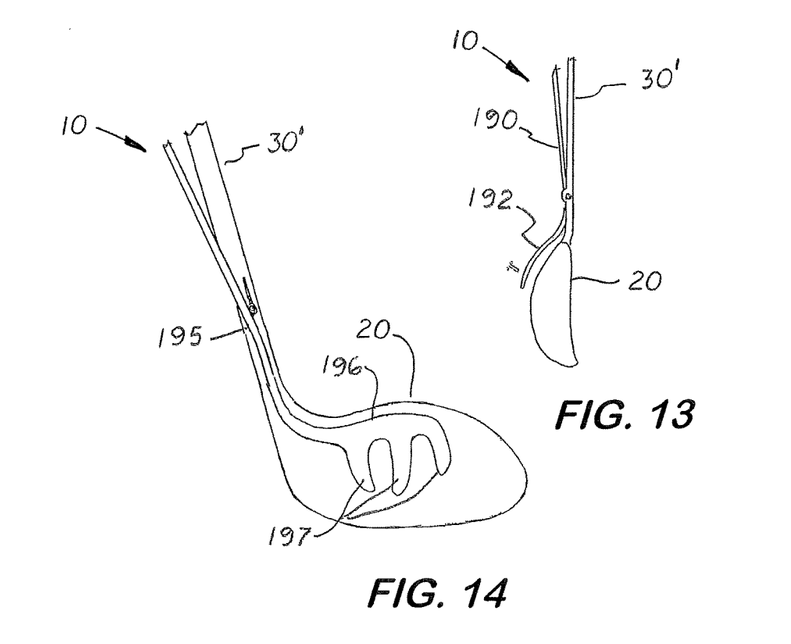
FIG. 13 is a side elevational view of another straight handle embodiment of the basting cooking utensil that includes an adjustable secondary arm pivotally attached to the lower section of the handle with a curved lower end that captures the top edge of the pan.
FIG. 14 is a side elevational view of another straight handle embodiment of the basting cooking utensil that includes an adjustable secondary arm pivotally attached to the lower section of the handle with a claw formed on the distal end of the secondary arm that includes teeth configured to engage the top edge of the pan.

FIG. 13 is a side elevational view of another straight handle embodiment of the basting cooking utensil 10 that includes an adjustable secondary arm 190 pivotally attached to the lower section of the handle 30' with a curved lower end 192 that captures the side wall of the pan.

FIG. 14 is a side elevational view of another straight handle embodiment of the basting cooking utensil 10 that includes an adjustable secondary arm 195 pivotally attached to the lower section of the handle 30' with a claw 196 formed on the distal end of the secondary arm 195 that includes teeth 197 configured to engage the side and the top edge of the pan.

Figure 15:
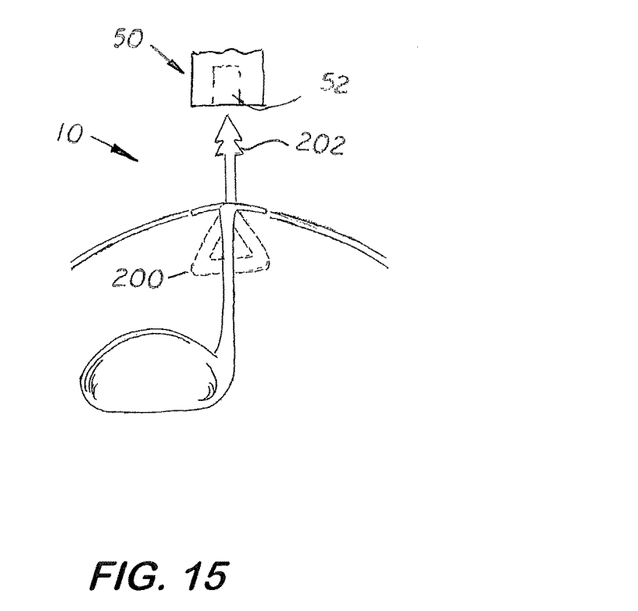
FIG. 15 is a partial top plan view of another embodiment of the basting cooking utensil with a rear triangular member formed in the middle section of the handle and includes a serrated tip that is pressed into a slot formed on the end of a cover.

FIG. 15 is a partial top plan view of another embodiment of the basting cooking utensil with a rear triangular member 200 formed in the middle section of the handle 30' and includes a serrated tip 202 that is pressed into a slot 52 formed on the end of a cover 50.

Figure 16:
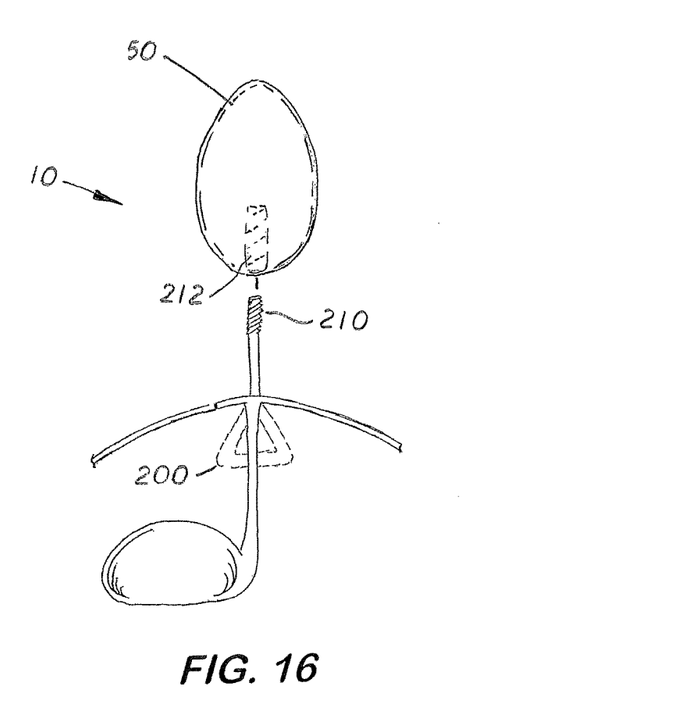
FIG. 16 is a partial top plan view of another embodiment of the basting cooking utensil with a rear triangular member formed in the middle section of the handle and includes a threaded tip that is pressed into the threaded bore formed on the end of a cover.

FIG. 16 is a partial top plan view of another embodiment of the basting cooking utensil 10 also with a rear triangular member 200 formed in the middle section of the handle 30' and includes a threaded tip 210 that is pressed into the threaded bore 212 formed on the end of a cover 50. The cover 50 can be rotated on the end of the handle 30 to change the orientation of the basin 20 respect to the cover 50 if desired.

Figure 17:
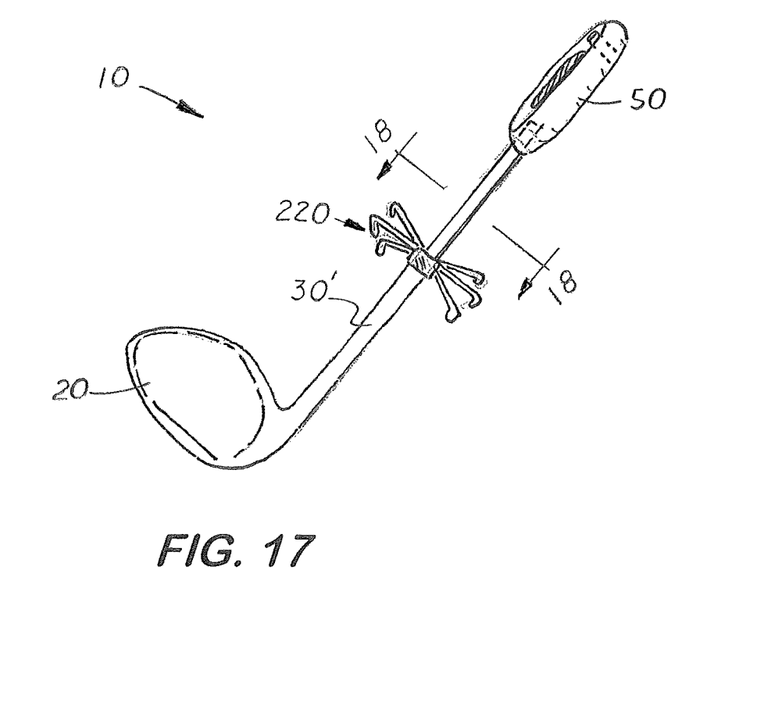
FIG. 17 is a perspective of basting cooking utensil with a turn cap mounted on the middle section that has a plurality of flexible arms attached thereto that extend laterally to engage the top edge of the pan.

FIG. 17 is a perspective of basting cooking utensil 10 with a turn cap 220 mounted on the middle section of the handle 30' that has a plurality of laterally extending flexible arms 225 attached thereto that can be repositioned around the axis of the handle 30' to engage the top edge of the pan. The upper section of the handle 30' attached to the cover 50 can be rotated to change the orientation of the basin 20 respect to the cover 50 if desired.

Figure 18:
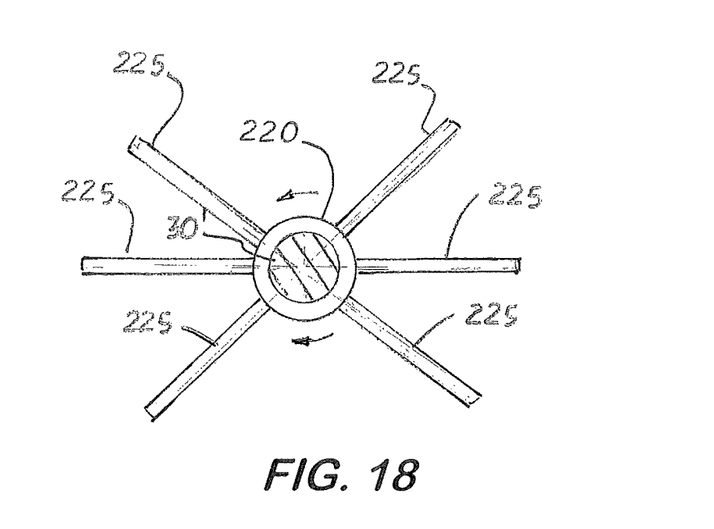
FIG. 18 is a top plan view of the basting cooking utensil taken along line 18-18 in FIG. 17.

FIG. 18 is a top plan view of the basting cooking utensil 10 taken along line 18-18 in FIG. 17.

Figures 19, 20:
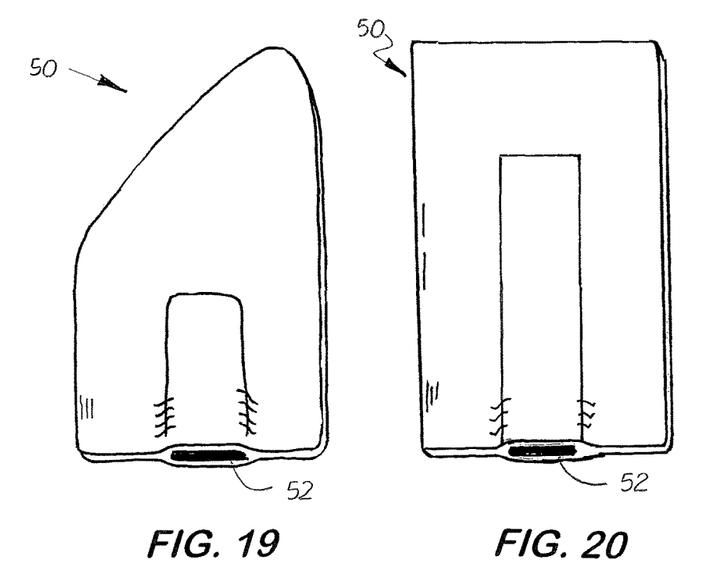
FIGS. 19-21 are illustrations of three types of a cover.
Figure 21:
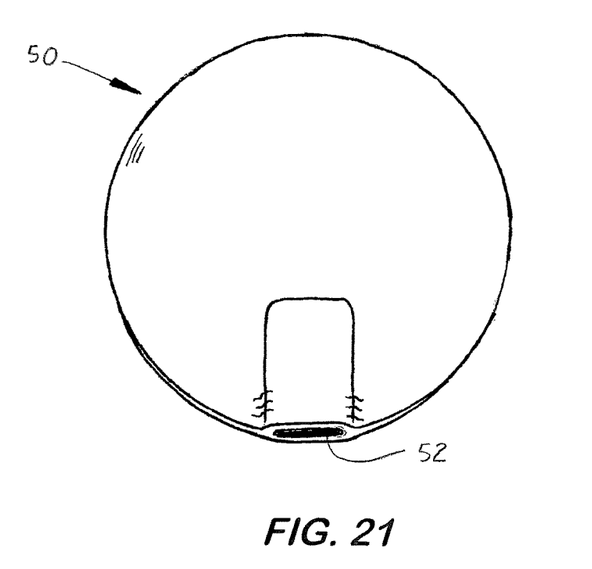

FIGS. 19-21 are illustrations of three types of a cover 50 with slots 52.

The basin 20 and handle 30, 30' are made of heat resistant thermoplastic material or nylon, or metal (i.e. aluminum or stainless steel). The basin 20 may be covered with polytetrafluoroethylene, commonly sold under the trademark TEFLON owned by E. I. du Pont de Nemours Inc. The cover 50 may be made of plastic or foam. The handle may also made of heat resistant plastic that is bendable into a fix position relative to the basin enabling the user to adjust the utensil for a particular pan.

In compliance with the statute, the invention described has been described in language more or less specific as to structural features. It should be understood, however, that the invention is not limited to the specific features shown, since the means and construction shown comprises the preferred embodiments for putting the invention into effect. The invention is therefore claimed in its forms or modifications within the legitimate and valid scope of the amended claims, appropriately interpreted the doctrine of equivalents.

I claim:

1. A basting cooking utensil used to cook food in a pan with a bottom surface, a side wall and a top edge, said utensil comprising:
   a. a handle that includes a longitudinal axis, a lower section, a mid-section an upper section and a rear surface;
   b. a basin attached or formed on said lower section of said handle, said basin includes a first lateral edge, a second lateral edge, a transverse axis, and a longitudinal axis, said basin rotated so that said longitudinal axis of said basin forms an angle in the range of 30 to 50 degrees with respect to said longitudinal axis of said handle, said basin is also rotated 15 to 40 degrees along its said longitudinal axis thereby lowering said first lateral edge and elevating said second lateral edge when said basin is disposed on said bottom surface of said pan and said handle is extended upward and positioned against said side wall of said pan; and,
   c. at least one pan edge engaging structure located on said mid-section of said handle, said pan edge engaging structure configured to extend over said top edge of said pan when said basin is positioned on said bottom surface of said pan and said handle is extended upward adjacent to said side wall to temporarily hold said utensil upright in said pan.

2. The utensil, as recited in claim 1, further including a cover located on said upper section of said handle.

3. The utensil, as recited in claim 1, wherein said pan edge engaging structure is at least one hook configured to extend laterally from said rear surface to capture said top edge of said pan when said handle is positioned inside said pan and adjacent to said side wall.

4. The utensil, as recited in claim 3, further including a cover located on said upper section of said handle.

5. The utensil, as recited in claim 1, wherein said pan edge engaging structure comprises two hooks configured to extend rearward from said handle to extend over and rest against said top edge of said pan when said handle is positioned inside said pan and adjacent to said side wall.

6. The utensil, as recited in claim 5, further including a cover located on said upper section of said handle.

7. A method for cooking a 'sunny-side up egg' in a pan containing hot basting fluid comprising the following steps;
   a. selecting a pan with a bottom surface and a raised side wall with a top edge;
   b. depositing the contents of an uncooked egg onto the bottom surface of said pan, said egg contents comprises a partially formed yoke surrounded by liquid egg white;
   c. depositing a liquid basting fluid into said pan;
   d. heating said pan to a sufficient temperature to slowly cook said egg;
   e. selecting a basting cooking utensil that includes a handle with a longitudinal axis, a lower section, a mid-section and an upper section, a basin attached or formed on said lower section of said handle, said basin includes a first lateral edge, a second lateral edge, and a longitudinal axis, said basin rotated so that said longitudinal axis of said basin forms an angle in the range of 30 to 50 degrees with respect to said longitudinal axis on said handle, said basin also rotated 15 to 40 degrees along its said longitudinal axis thereby lowering said first lateral edge and elevating said second lateral edge when said basin is disposed against said bottom surface of said pan and said handle is extended upward and positioned against said side wall of said pan; and a pan edge engaging structure located on said mid-section of said handle, said pan engaging structure configured to extend over said top edge of a said pan when said basin is disposed over said bottom surface;
   f. while holding said handle, placing said basin into said pan and moving the first lateral edge along said bottom surface of said pan to scoop hot basting fluid into said basin;
   g. depositing said hot basting fluid over said yoke and said egg white;
   h. repeating steps f and g as desired until said yoke and said egg white are cooked to a desired state; and,
   i. storing said utensil with said basin positioned inside said pan with said handle extending above said top edge of said pan, and said pan edge engaging structure resting on said top edge of said pan.

* * * * *